United States Patent
Danda et al.

(10) Patent No.: US 12,066,955 B2
(45) Date of Patent: Aug. 20, 2024

(54) SYSTEM AND METHOD FOR ENHANCING THROUGHPUT DURING DATA TRANSFER

(71) Applicant: Hughes Network Systems, LLC, Germantown, MD (US)

(72) Inventors: Aneeshwar Danda, Germantown, MD (US); Robert H. Lager, Germantown, MD (US); Sahithi Vemuri, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 17/565,779

(22) Filed: Dec. 30, 2021

(65) Prior Publication Data
US 2022/0374368 A1 Nov. 24, 2022

Related U.S. Application Data

(60) Provisional application No. 63/190,348, filed on May 19, 2021.

(51) Int. Cl.
*G06F 13/28* (2006.01)
*G06F 13/16* (2006.01)

(52) U.S. Cl.
CPC ................ *G06F 13/1668* (2013.01)

(58) Field of Classification Search
None
See application file for complete search history.

(56) References Cited

U.S. PATENT DOCUMENTS

| | | | | |
|---|---|---|---|---|
| 5,598,579 A * | 1/1997 | Welker | ................ | G06F 13/4036 710/22 |
| 6,321,310 B1 * | 11/2001 | McCarthy | ............... | G06F 13/28 710/33 |
| 6,385,670 B1 * | 5/2002 | Spilo | ...................... | G06F 13/28 375/364 |
| 6,711,709 B1 * | 3/2004 | York | .................... | H04L 1/0061 714/748 |
| 6,782,445 B1 * | 8/2004 | Olgiati | ................... | G06F 13/28 712/E9.067 |
| 7,089,391 B2 * | 8/2006 | Geiger | .................... | G06F 12/08 711/170 |
| 7,383,424 B1 * | 6/2008 | Olgiati | ................... | G06F 15/16 712/228 |
| 9,348,750 B1 * | 5/2016 | Knopp | ...................... | G06F 5/01 |
| 9,668,011 B2 * | 5/2017 | D'Luna | .............. | H04N 21/8146 |
| 10,972,286 B2 * | 4/2021 | Eidenschink | ....... | H04L 63/0853 |
| 10,985,911 B2 * | 4/2021 | Srinivasan | ............ | G06F 21/602 |

(Continued)

OTHER PUBLICATIONS

International Search Report and Written Opinion issued Sep. 21, 2022 in corresponding International Application No. PCT/US2022/029982.

(Continued)

*Primary Examiner* — Hyun Nam
(74) *Attorney, Agent, or Firm* — GLOBAL IP COUNSELORS, LLP

(57) ABSTRACT

Systems and method for transferring data are disclosed herein. In an embodiment, a method of transferring data includes reading a plurality of bytes from a first memory, discarding first bytes of the plurality of bytes, realigning second bytes of the plurality of bytes, and storing the realigned second bytes in a second memory.

20 Claims, 4 Drawing Sheets

(56) References Cited

U.S. PATENT DOCUMENTS

| | | | |
|---|---|---|---|
| 10,992,591 B1* | 4/2021 | Thomas | H04L 12/4633 |
| 11,108,819 B2* | 8/2021 | Anderson | H04W 12/02 |
| 11,310,352 B2* | 4/2022 | Isomäki | H04L 69/16 |
| 11,494,761 B2* | 11/2022 | Goeringer | G06Q 20/3827 |
| 2002/0106018 A1* | 8/2002 | D'Luna | H04N 21/435 |
| | | | 348/E5.005 |
| 2005/0132244 A1 | 6/2005 | Milway | |
| 2010/0106880 A1 | 4/2010 | Bellows et al. | |
| 2015/0356768 A1* | 12/2015 | Taylor | G06T 15/005 |
| | | | 345/428 |
| 2022/0374368 A1* | 11/2022 | Danda | G06F 13/1668 |

OTHER PUBLICATIONS

Mauricio Alvarez et al.; "Performance Impact of Unaligned Memory Operations in SIMD Extensions for Video Codec Applications"; 2007 IEEE International Symposium on Performance Analysis of Systems & Software; c. Apr. 2007; pp. 62-71.

Nikola Vujic et al.; "DMA++: On the Fly Data Realignment for On-Chip Memories"; IEEE Transactions on Computers; c. Dec. 2010; pp. 237-250.

\* cited by examiner

SYSTEM AND METHOD FOR ENHANCING THROUGHPUT DURING DATA TRANSFER

BACKGROUND

Field of the Invention

The present disclosure generally relates to a system and method for enhancing throughput when transferring data. In particular, the present disclosure relates to a system and method for enhancing throughput during unaligned memory transfers by realigning the data being transferred between memories.

Background Information

Many systems transfer data from memory-to-memory, memory-to-peripheral or peripheral-to-memory. Processors typically offload this task to a hardware device called a DMA (Direct Memory Access) controller. However, DMA controllers are difficult to design so as to optimize throughput with minimal interaction with the processor, particularly when dealing with unaligned source or destination memory accesses. These tend to introduce an overhead of realigning the data to transfer reliably. Many systems rely on software padding to ensure that data packets are always aligned to a 64-bit boundary. Others rely on writing micro-codes to perform multiple reads and writes to realign the data. This adds an overhead on the processor to write out efficient algorithms to trigger the DMA.

SUMMARY

It has been determined that existing systems are not designed to optimize throughput with minimal interaction with a processor. The present disclosure therefore provides an innovative system and method which read unaligned source data, re-align it to a destination alignment, and store it in an internal burst buffer. The write to the destination is inline with the offset of the unaligned data. The disclosed process minimizes the unalignment overhead as the reads are read at the previous aligned boundary, excess data is dropped, and the remaining data is realigned to the destination offset and stored. Once the writes are started, the data is aligned to the required byte lane and using relevant write strobes the data is written to the destination with low overhead.

The present disclosure provides an improved DMA controller, for example, associated with an ASIC (Application-Specific Integrated Circuit) or FPIG (Field-Programmable Gate Array) system.

In view of the state of the known technology, one aspect of the present disclosure is to provide a method of transferring data. The method includes reading a plurality of bytes from a first memory, discarding first bytes of the plurality of bytes, realigning second bytes of the plurality of bytes, and storing the realigned second bytes in a second memory.

Another aspect of the present disclosure is to provide another method of transferring data. The method includes generating a read command associated with a first memory, reading a plurality of bytes from the first memory, discarding first bytes of the plurality of bytes, realigning second bytes of the plurality of bytes in a burst buffer, and transmitting the burst buffer to a second memory.

Another aspect of the present disclosure is to provide a method of transferring data between a first memory and a second memory having different architectures. The method includes determining a source offset for the first memory, determining a destination offset for the second memory, reading a plurality of bytes from the first memory based on the source offset, realigning the plurality of bytes based on the destination offset, and transferring the realigned plurality of bytes to the second memory.

Also, other objects, features, aspects and advantages of the disclosed system and method will become apparent to those skilled in the art in the field of data transfer from the following detailed description, which, taken in conjunction with the annexed drawings, discloses preferred embodiments of data transfer systems and methods with various features.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
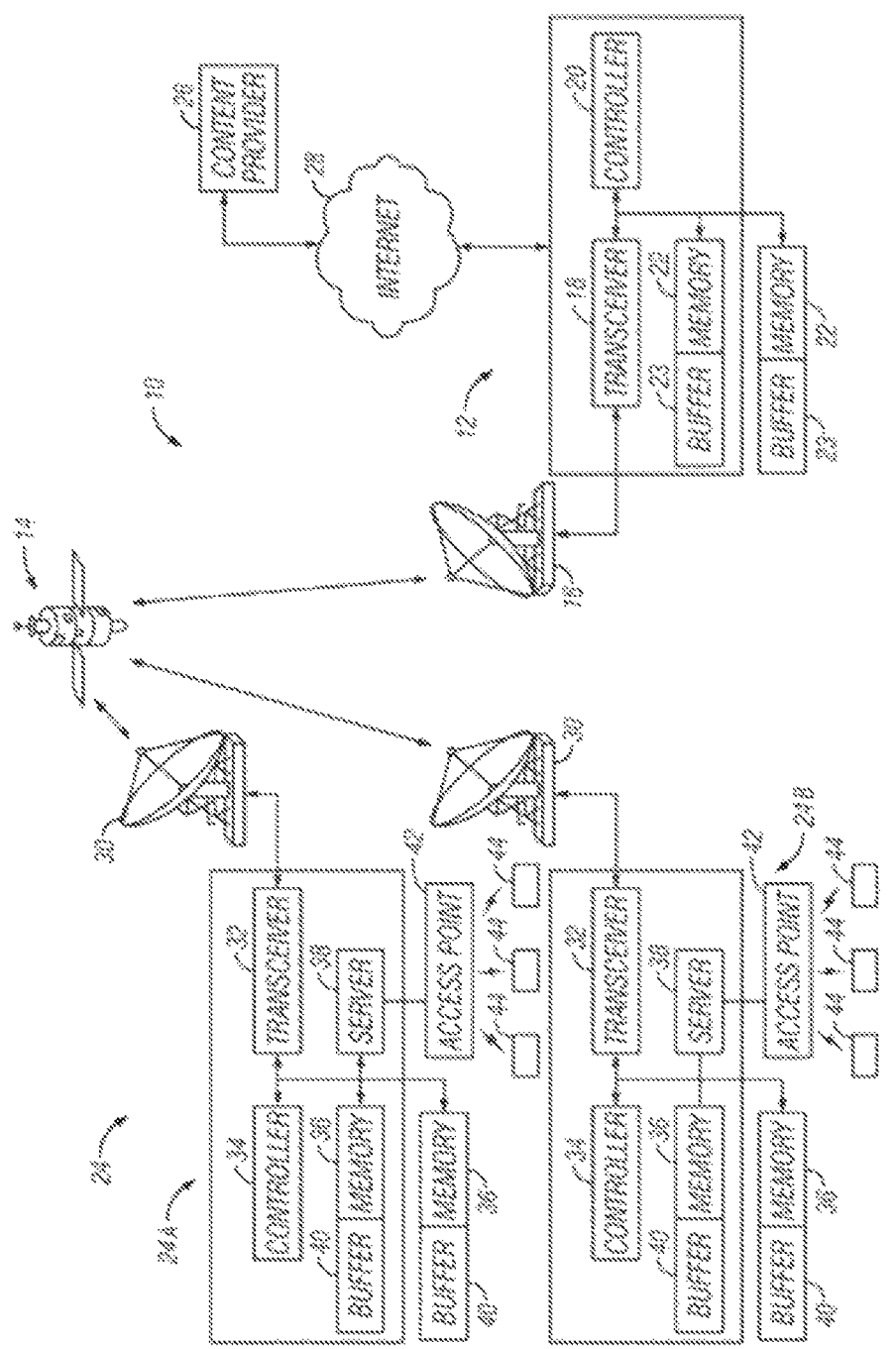
FIG. 1 illustrates an example embodiment of a satellite communication network configured to utilize the data transfer systems and methods disclosed herein.

FIG. 1 illustrates an example embodiment of a satellite communication network 10 in accordance with the present disclosure. A satellite communication network 10 typically includes a terrestrial gateway or base station 12 (hereinafter "base station 12") that communicates with one or more orbiting satellites 14. The system 10 can include a plurality of base stations 12. A base station 12 is configured to process data received via one or more orbiting satellites 14. Each base station 12 can include an antenna dish 16, a transceiver 18, a controller 20, one or more memory 22 and other types of equipment (not shown) such as amplifiers, waveguides and so on as understood in the art which enable communication between the base station 12 and a plurality of terminals 24 via one or more of the orbiting satellites 14. The one or more memory 22 can be, for example, an internal memory in the base station 12, or other type of memory devices such as flash memory or hard drives with an external high speed interface such as a USB bus or an SATA bus, or remote memories such as cloud storage and so on. These other types of memory can be present at the base station 12 or accessible at a location apart from the base station 12 via a network connection such as an Ethernet connection, a WiFi connection or any other suitable type of connection as understood in the art. Also, the memory 22 can include at least one buffer 23 which is configured to buffer, for example, data transmitted to or from a memory 22.

As understood in the art, the controller 20 preferably includes a microcomputer with a control program that controls the base station 12 as discussed herein. The controller 20 can also include other conventional components such as an input interface circuit, an output interface circuit, and storage devices such as a ROM (Read Only Memory) device and a RAM (Random Access Memory) device. The RAM and ROM store processing results and control programs that are run by the controller 20. The controller 20 is operatively coupled to the components of the base station 12 as appropriate, in a conventional manner. It will be apparent to those skilled in the art from this disclosure that the precise structure and algorithms for the controller 20 can be any combination of hardware and software that will carry out the functions of the present disclosure.

The base station 12, the satellite 14 and the terminals 24 typically communicate with each other over a radio frequency link, such as a Ku-band link, a Ka-band link or any other suitable type of link as understood in the art, which can generally be referred to as a space link. In an embodiment, the base station 12 can include or be configured as an inroute group manager, which can be configured to control the bandwidth allocations to the terminals 24 (e.g., on an inroute or inroute group basis), and to correspondingly control and administer the bandwidth allocation approaches. Also, one or more base station 12 can include or be configured as a network management system, which, among other things, operates to communicate with remote sites, such as web content providers 26, via the Internet 28, cloud storage, or other communication networks as understood in the art. In addition, the base stations 12 can communicate with each other via, for example, the Internet 28 or other communication networks.

The satellite communication network 10 includes a plurality of terminals 24. In FIG. 1, the plurality of terminals 24 includes a first terminal 24A and a second terminal 24B. Each of the first terminal 24A and the second terminal 24B can be configured as discussed herein with respect to a terminal 24. Although only two terminals 24 are shown in FIG. 1, it should be understood from this disclosure that the two terminals 24 are shown for simplicity and that there can be more terminals 24.

As shown in FIG. 1, a terminal 24 typically includes an antenna dish 30, a transceiver 32, a controller 34, one or more memory 36, a local server 38 and other types of equipment (not shown) such as amplifiers, waveguides and so on as understood in the art which enable communication between the terminal 24 and one or more base stations 12 via one or more of the orbiting satellites 14. The antenna dish 30 enables the transmission of data between the terminal 24 and the satellite 14. A transceiver 32 can include, for example, an integrated satellite modem and any other suitable equipment which enables the transceiver 32 to communicate with one or more of the orbiting satellites 14 as understood in the art. The one or more memory 36 can be, for example, an internal memory in the terminal 24, or other type of memory devices such as a flash memory or hard drives with an external high speed interface such as a USB bus or an SATA bus, or remote memories such as cloud storage and so on. These other types of memory can be present at the terminal 24 or accessible at a location apart from the terminal 24 via a network connection such as an Ethernet connection, a WiFi connection or any other suitable type of connection as understood in the art. Moreover, the one or more memory 36 can include at least one buffer 40 which is configured to buffer, for example, data transmitted to or from a memory 36.

In an embodiment, the local server 38 is configured to enable local communication between terminals 24. For example, the local server 38 of the first terminal 24A can include a transceiver which communicates with another transceiver of the local server 38 of the second terminal 24B. The first terminal 24A and the second terminal 24B can communicate using wireless technology, for example, a low-power wide-area network (LPWAN), low power embedded (LPE) Zigbee, and/or any other suitable wireless communication protocol. Alternatively, the first terminal 24A and the second terminal 24B can communicate using wired technology.

The local server 38 can also include or communicate with an access point 42, such as a wireless application protocol (WAP) or any other suitable device, which enables the local server 38 to send and receive data to and from user devices 44. Such user devices 44 can include user devices such as desktop computers, laptop or notebook computers, tablets (e.g., iPads), smart phones, smart TVs and any other suitable devices as understood in the art. Thus, in an embodiment, the local server 38 is configured to collect data from user devices 44 for eventual transmission to the base station 12 via the satellite 14 and/or send data to user devices 44 which has been received from the base station 12 via the satellite 14. Naturally, the communications between the local server 38, the access point 42 and the data supplying devices 44 can occur over wireless connections, such as WiFi connections, as well as wired connections as understood in the art.

As with the controller 20 for a base station 12, the controller 34 preferably includes a microcomputer with a control program that controls the terminal 24 as discussed herein. The controller 34 can also include other conventional components such as an input interface circuit, an output interface circuit, and storage devices such as a ROM (Read Only Memory) device and a RAM (Random Access Memory) device. The RAM and ROM store processing results and control programs that are run by the controller 34. The controller 34 is operatively coupled to the components of the terminal 24 as appropriate, in a conventional manner. It will be apparent to those skilled in the art from this disclosure that the precise structure and algorithms for the controller 34 can be any combination of hardware and software that will carry out the functions of the present disclosure.

In an embodiment, a terminal 24 can be any IoT (Internet of Things) device. For example, a terminal 24 can be a very small aperture terminal (VSAT) with a downlink/uplink transceiver 32. Each VSAT can collect data from one or more data supplying devices 44 such as desktop computers, laptop or notebook computers, tablets (e.g., iPads), smart phones, smart TVs and any other suitable devices. Each VSAT can also enable the plurality of user devices 44 to access a data network such as the Internet 28 via the base station 12 and thus transmit data to the user devices 44. The VSAT can also enable an end user device 44 to access the data network to obtain a satellite service such as cable television.

Figure 2:
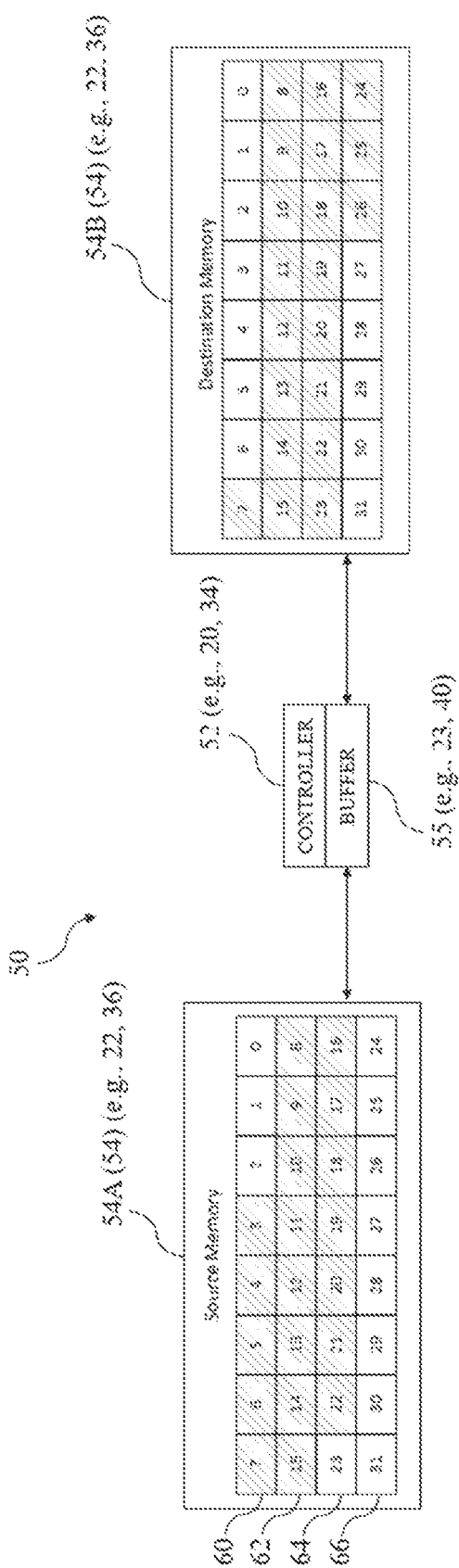
FIG. 2 illustrates an example embodiment of a data transfer system in accordance with the present disclosure.

FIG. 2 illustrates an example embodiment of a data transfer system 50 including a controller 52 which operates with one or more memory 54 and one or more buffer 55. The controller 52 can include, for example, the controller 20 illustrated in FIG. 1, the controller 34 illustrated in FIG. 1, the controller of a user device 44 of FIG. 1, or another controller. The one or more memory 54 can include, for example, the one or more memory 22 illustrated in FIG. 1, the one or more memory 36 illustrated in FIG. 1, one or more memory at a user device 44 of FIG. 1, or another memory. The one or more memory 54 can include a source memory and a destination memory located, for example, at a base station 12, at a terminal 24, at a user device 44, and/or at more than one of a base station 12, a terminal 24, and a user device 44. The buffer 55 can include, for example, the buffer 23 illustrated in FIG. 1, the buffer 40 illustrated in FIG. 1, a buffer at the user device 44 of FIG. 1, or another buffer.

In the illustrated embodiment, the controller 52 operates with a first memory 54A and a second memory 54B. Here, the first memory 54A is a source memory and the second memory 54B is a destination memory. Alternatively, the first memory 54B can be the destination memory and the second memory 54B can be the source memory. The bytes 1 to 31 shown in each memory 54A, 54B in FIG. 2 is for illustration and explanation purposes only and is not intended to limit the memories 54A, 54B. In an embodiment, the first memory 54A and the second memory 54B are both a memory 22 located at a base station 12. In another embodiment, the first memory 54A and the second memory 54B are both a memory 36 located at a terminal 24. In another embodiment, the first memory 54A and the second memory 54B are both a memory located at a user device 44. In another embodiment, the first memory 54A is located at one of a base station 12, a terminal 24, or a user device 44 and the second memory 54B is located at another of a base station 12, a terminal 24, or a user device 44.

In an embodiment, the controller 55 preferably includes a microcomputer with a control program that executes the methods discussed herein. The controller 55 can also include other conventional components such as an input interface circuit, an output interface circuit, and storage devices such as a ROM (Read Only Memory) device and a RAM (Random Access Memory) device. The RAM and ROM store processing results and control programs that are run by the controller 55. The controller 55 is operatively coupled to the components of the system 10 as appropriate, in a conventional manner. It will be apparent to those skilled in the art from this disclosure that the precise structure and algorithms for the controller 55 can be any combination of hardware and software that will carry out the functions of the present disclosure.

Figure 3:
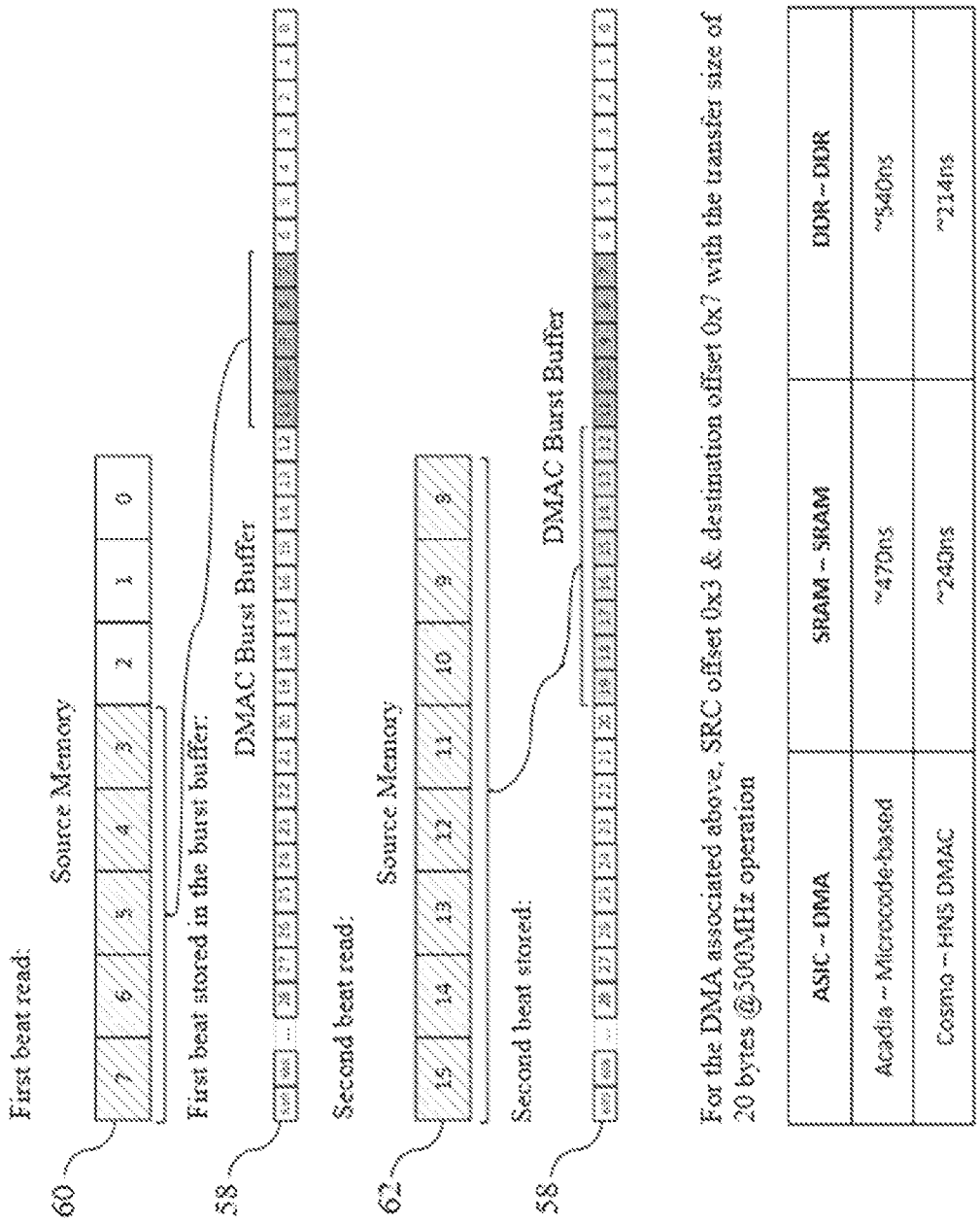
FIG. 3 illustrates an example embodiment of a data transfer using the example embodiment shown in FIG. 2.

FIG. 3 illustrates an example embodiment showing how the system 50 shown in the example embodiment of FIG. 2 is configured to read unaligned source data, re-align the data to a destination alignment and store the data in an internal burst buffer. For example, in the illustrated embodiment, with a 64-bit bus architecture the alignment is 8-byte. If the first (source) memory 54A is offset by N (N=0-7) and the second (destination) memory 54B is offset by M (M=0-7), the controller 52 is configured to issue a read 8-byte aligned, discard the unwanted bytes (0 to (N−1), if N≠0), and realign those bytes to the alignment defined by the destination placing the byte read at position N to position M of the burst buffer 58. The burst buffer 58 can thus be configured based on the destination offset. As used herein, unwanted bytes and wanted bytes can also be referred to as first bytes and second bytes.

Using the source memory and the destination memory shown in FIG. 2, a traditional DMA used in Acadia would issue the following read commands: (1) First AXI read from SRC addr 0x03, arlen=0x4, arsize=0x0; (2) Second AXI read from SRC addr 0x08, arlen=0x0, arsize=0x3; and (3) Third AXI read from SRC addr 0x10, arlen=0x6, arsize=0x0. In prior systems, these commands were stored in a buffer which would enable writes to destination memory. The loads from this buffer though pipelined would require a variable number of clock cycles to output the required data.

With the system and method of the present disclosure, the controller 52 utilizes a burst buffer 58 with a plurality of outstanding read transactions for greater throughput. The burst buffer 58 can be configured based on the destination offset (M). In the example embodiment shown in FIGS. 2 and 3, the controller 52 utilizes a burst buffer 58 with four read transactions corresponding to a first beat 60, a second beat 62, a third beat 64 and a fourth beat 66. As seen in FIG. 2, the size of the beats 60, 62, 64, 66 are based on the bus architecture of the first memory 54A. In the illustrated embodiment, the first memory 54A has a 64-bit bus architecture with each beat having 8 bytes. For simplicity, only four beats 60, 62, 64, 66 are shown. The burst buffer 58 is aligned with the second memory 54B. More specifically, the burst buffer 58 is aligned based on the destination offset (M). In the illustrated embodiment shown in FIG. 3, the second memory has 64 bits and the burst buffer 58 has 640 frames.

Referring to FIG. 3, using the same example as above, the controller 52 sends out a single AXI read command: SRC addr 0x0, arlen=0x2, arsize=0x3. The single read command can be stored in the burst buffer 58. For example, using the example shown in FIG. 3, the single read command can be stored using the first seven frames (0-6) of the burst buffer 58.

Still referring to FIG. 3, the controller 52 reads the first beat 60 from the source memory 54A. In the illustrated embodiment, the first beat 60 includes bytes 0-7 of the first memory 54A. Bytes 0-2 are unwanted (first bytes) and bytes 3-7 are wanted (second bytes). The controller 52 discards the lower three bytes of data (0x0, 0x1 and 0x2) and stores the remaining data received from 0x3 in the burst buffer 58. Specifically, the controller 52 discards the first three bytes (0-2 of the first memory 54A) and the remaining five bytes (3-7 of the first memory 54A) are stored at frames 7-11 of the burst buffer 58. The remaining five bytes (3-7 of the first memory 54A) are thus rearranged into the next available frames of the burst buffer 58.

The controller 52 then reads the second beat 62. In the illustrated embodiment, the second beat 62 includes bytes 8-15 of the first memory 54A. Here, all bytes in the second beat 62 are wanted (second bytes) and no bytes are discarded. The controller 52 therefore realigns the data to store bytes 8-15 at frames 12-19 of the burst buffer 58. The remaining bytes 8-15 are thus rearranged into the next available frames of the burst buffer 58.

The controller 52 then performs the same process for the third beat 64, the fourth beat 66, etc. until all bytes of the first memory 54A have been read and realigned in the burst buffer 58. In the illustrated embodiment of FIG. 2, bytes 16-22 of the third beat 64 are wanted (second bytes) and byte 23 is unwanted (first byte), and all bytes of the fourth beat 66 are unwanted (first bytes). Bytes 16-22 of the third beat 64 are thus rearranged into the next available frames of the burst buffer 58, which here is frames 20-26 of the burst buffer 58.

Again referring to FIG. 2, once the burst buffer 58 is transmitted to the second memory 54B, the second memory 54B stores all of the wanted bytes (second bytes) from the first memory 54A in the realigned configuration. As seen in FIG. 2, in the illustrated example, bytes 3-22 of the first memory 54A are wanted, for a total of twenty wanted bytes. These wanted bytes have been realigned as bytes 7-26 in the second memory 54B. The discarded bytes have not been transferred. The single read command can also be stored, for example, at bytes 0-7 of the second memory 54B.

Since the read data in the illustrated embodiment is optimized to always get 8-bytes at a time (and discard the bytes not required), the read unaligned offset (N) can be greater than, equal to or less than the destination offset (M). The 8-bytes of data is then accessed each cycle, with the data aligned to the second memory 54B (e.g., the destination address). Here, the write always takes out 8-bytes from the burst buffer 58, which is already aligned to the second (destination) memory 54B and puts it on the write data bus. This ensures the unaligned data is written out to the second memory 54B (e.g., the destination address) with minimal overhead.

Figure 4:
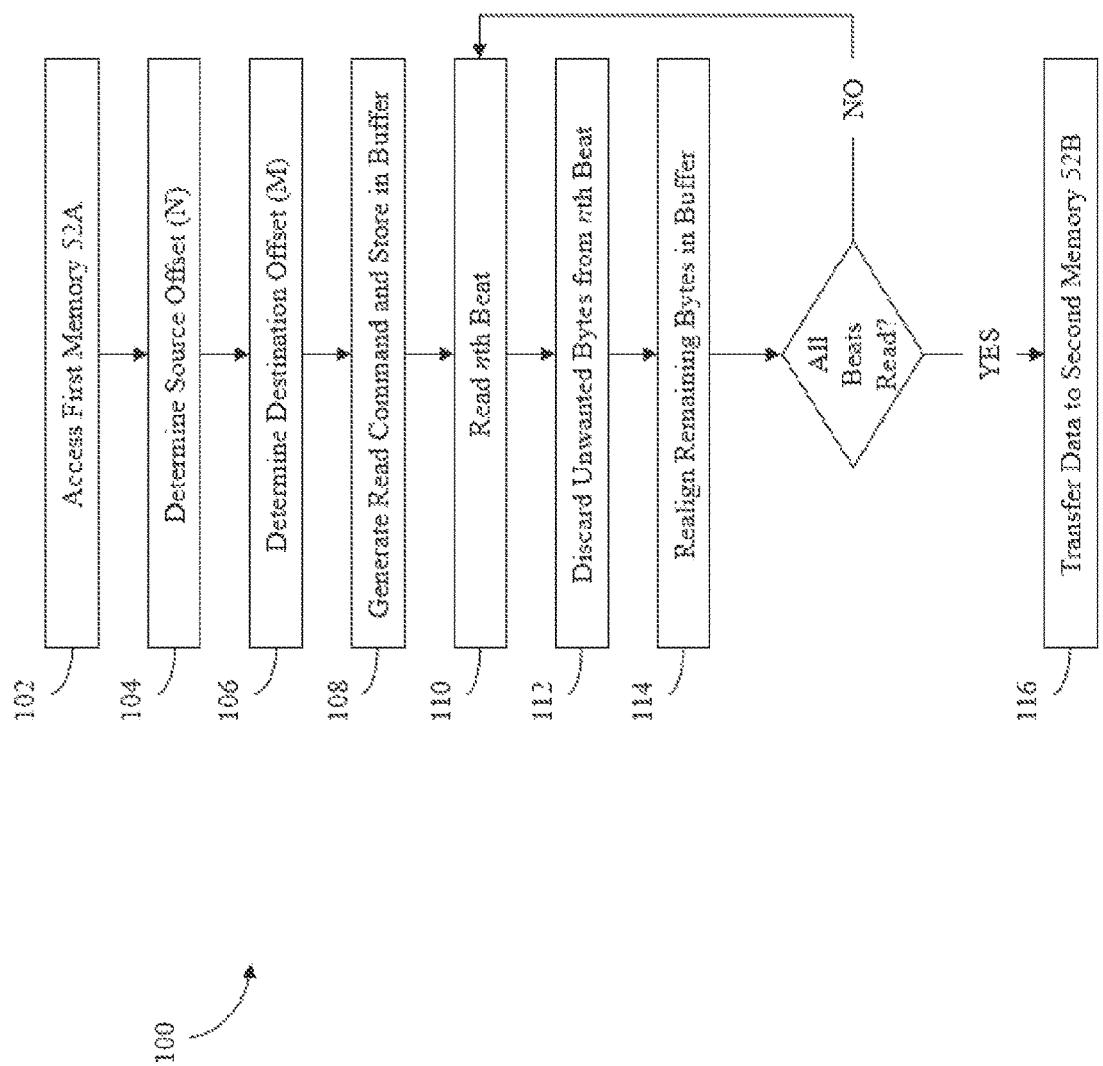
FIG. 4 illustrates an example embodiment of a data transfer method in accordance with the present disclosure.

FIG. 4 illustrates an example embodiment of a method 100 which can be performed by the controller 52. Using the method 100, the controller 52 is configured to transfer data from a first memory 54A (e.g., a source memory or address) to a second memory 54B (e.g., a destination memory or address). It should be understood that the steps of method 100 can be stored as instructions on a memory and executed by the controller 52 to perform the method 100.

At step 102, the controller 52 accesses a first memory 54A. The controller 52 can also access the second memory 54B. As illustrated in FIG. 2, the first memory 54A can be a source memory and the second memory 54B can be a destination memory. Each memory can be located, for example, at a base station 12, a terminal 24, or a user device 44. Here, the controller 52 can determine the architecture (e.g., number of bits) of the first memory 54A and/or the second memory 54B. Alternatively, the controller 52 can be preconfigured to store the architecture of the first memory 54A and/or the second memory 54B. In an embodiment, the controller 52 can initiate the method 100 upon determining that the architectures of the memories are unaligned, for example, due to different byte sizes.

At step 104, the controller 52 determines a source offset (N) for the first memory 54A. The controller 52 is configured to determine the source offset based on the architecture of the first memory 54A. In the example illustrated in FIGS. 2 and 3, the first memory 54A has a 64-bit bus architecture, so the controller determines that the alignment is 8-byte and the source offset is N=0-7. The controller 52 can also be preconfigured with the source offset (N) of the first memory 54A. Here, the controller 52 can further distinguish the beats to be read from the first memory 54A.

At step 106, the controller 52 determines a destination offset (M) for the second memory 54B. The controller 52 is configured to determine the destination offset based on the architecture of the second memory 54B. In the example illustrated in FIGS. 2 and 3, the destination offset is M=0-7. The controller 52 can also be preconfigured with the destination offset (M) of the second memory 54B.

At step 108, the controller 52 generates a read command. The read command can be a single read command, for example, a single AXI ("Advanced eXtensible Interface") read command. In the example of FIG. 3, the read command is as follows: SRC addr 0x0, arlen=0x2, arsize=0x3. In an embodiment, the read command can be stored in the first one or more frames of the burst buffer 58, for example, frames 0-6 of the burst buffer 58 shown in FIG. 3. Here, the controller 52 can further distinguish the beats to be read.

The controller 52 then performs one or more read transactions, discards unwanted bytes (first bytes), and updates the burst buffer 58. Specifically, the read transactions can include repeating one or more of steps 110, 112 and 114, for example, reading an nth beat at step 110, discarding unwanted bytes at step 112, realigning the bytes to the alignment defined by the destination at step 114, and then optionally returning to step 110 to read the (n+1)th beat.

At step 110, the controller 52 reads an nth beat, for example, the first beat 60, the second beat 62, the third beat 64, the fourth beat 66, etc. Specifically, the controller 52 determines which bytes are wanted (second bytes) and which bytes are unwanted (first bytes). In the embodiment illustrated at FIGS. 2 and 3, the first beat 60 includes 8 bytes shown as 0 to 7. Bytes 0, 1 and 2 are unwanted, and bytes 3-7 are wanted. The second beat 62 includes 8 bytes shown as 8-15, which are all wanted. The third beat 64 includes 8 bytes shown as 16-23. Byte 23 is unwanted, and bytes 16-22 are wanted. The fourth beat 66 includes 8 bytes shown as 24-31, which are all unwanted.

At step 112, the controller 52 discards the unwanted bytes. In FIG. 3, the first beat includes three unwanted bytes (0-2) which are discarded. The third beat 64 includes one unwanted byte (23) which is discarded. The fourth beat 66 includes eight unwanted bytes (24-31) which are discarded.

At step 114, the controller 52 realigns the remaining (wanted) bytes to the alignment defined by the destination offset (M). Specifically, the controller 52 realigns the remaining bytes in the burst buffer 58. In the example embodiment shown, after discarding three bytes in the first beat 60, there are five bytes remaining. The controller 52 stores the remaining bytes at the next remaining frames in the burst buffer 58, which is frames 7-11 in the example shown. More specifically, the controller 52 realigns the remaining bytes so that bytes 3-7 in the first memory 54A are realigned in frames 7-11 in the burst buffer 58 and thus the second memory 54B. Similarly, the controller 52 realigns bytes 8-15 of the second beat 62 in frames 12-19 in the burst buffer 58 and thus the second memory 54B. Likewise, the controller 52 realigns bytes 16-22 of the third beat 64 in frames 20-26 in the burst buffer 58 and thus the second memory 54B.

If there are additional beats remaining, the controller 52 then returns to step 110 to read the next beat. For example, if the controller 52 has just finished performing steps 110-114 for the first beat 60 in the illustrated embodiment, then the controller 52 returns to step 110 to read the second beat 62. Here, the second beat 62 includes 8 bytes shown as 8 to 15. There are no unwanted bytes in the second beat, so the controller 52 can skip step 112 and realign the bytes from the second beat 62 in the burst buffer 58. The controller 52 can continue to perform steps 110, 112, and 114 for all remaining beats.

At step 116, the controller 52 causes the burst buffer 58 to be transferred to the second memory 54B. As seen in FIGS. 2 and 3, this results in the bytes from the first memory 54A being rearranged in the second memory 54B according to the frame arrangement in the burst buffer 58. The discarded bytes have not been transmitted from the first memory 54A to the second memory 54B.

The embodiments described herein provide improved systems and methods for transferring data between memories. These systems and methods are advantageous, for example, when transferring data between unaligned memories. It should be understood that various changes and modifications to the systems and methods described herein will be apparent to those skilled in the art and can be made without diminishing the intended advantages.

General Interpretation of Terms

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A method of transferring data between a first memory and a second memory, the method comprising
   reading a plurality of bytes from the first memory,
   discarding first bytes of the plurality of bytes;
   realigning second bytes of the plurality of bytes in a burst buffer based on a destination offset of the second memory; and
   transferring the realigned second bytes from the burst buffer to the second memory.

2. The method of claim 1, which includes determining a source offset for the first memory.

3. The method of claim 2, which includes separating the plurality of bytes into a plurality of beats based on the source offset.

4. The method of claim 2, which includes reading the plurality of bytes from the first memory based on the source offset.

5. The method of claim 1, which includes
   determining the destination offset for the second memory prior to reading the plurality of bytes from the first memory.

6. The method of claim 1, wherein
   the first memory is offset by N,
   the second memory is offset by M, and
   realigning the second bytes of the plurality of bytes in the burst buffer includes placing a byte read at position N of the first memory to position M of the burst buffer.

7. A system including a controller programmed to perform the method of claim 1.

8. A method of transferring data between a first memory and a second memory, the method comprising:
   generating a read command associated with the first memory;
   reading a plurality of bytes from the first memory;
   storing the read command in one or more first frames of a burst buffer;
   realigning the plurality of bytes in one or more second frames of the burst buffer based on a destination offset of the second memory; and
   transmitting the burst buffer to the second memory.

9. The method of claim 8, which includes determining a source offset for the first memory.

10. The method of claim 9, which includes separating the plurality of bytes into a plurality of beats based on the source offset.

11. The method of claim 9, which includes reading the plurality of bytes from the first memory based on the source offset.

12. The method of claim 8, which includes determining the destination offset for the second memory prior to generating the read command.

13. A system including a controller programmed to perform the method of claim 8.

14. A method of transferring data between a first memory and a second memory having different architectures, the method comprising:
   determining a source offset for the first memory;
   determining a destination offset for the second memory;
   reading a plurality of bytes from the first memory based on the source offset;
   realigning the plurality of bytes in a burst buffer based on the destination offset; and
   transferring the realigned plurality of bytes to the second memory.

15. The method of claim 14, wherein
   the destination offset is different from the source offset.

16. The method of claim 14, which includes discarding first bytes of the plurality of bytes,
   wherein realigning the plurality of bytes includes realigning second bytes of the plurality of bytes in the burst buffer, and
   wherein transferring the realigned plurality of bytes to the second memory includes transmitting the realigned second bytes to the second memory.

17. A system including a controller programmed to perform the method of claim 14.

18. The method of claim 8, comprising
   discarding first bytes of the plurality of bytes, and
   wherein realigning the plurality of bytes in one or more second frames of the burst buffer includes realigning second bytes of the plurality of bytes in one or more second frames of the burst buffer.

19. The method of claim 1, comprising
   reading third bytes of the plurality of bytes from the first memory after realigning the second bytes in the burst buffer,
   realigning the third bytes in the burst buffer prior to transferring the realigned second bytes from the burst buffer to the second memory, and
   transferring the realigned second bytes and the realigned third bytes from the burst buffer to the second memory.

20. The method of claim 1, comprising
   reading a first beat including the first bytes and the second bytes from the first memory,
   discarding the first bytes of the plurality of bytes,
   realigning the second bytes of the plurality of bytes in the burst buffer,
   reading a second beat including third bytes from the first memory,
   realigning the third bytes of the plurality of bytes in the burst buffer,
   determining that all beats have been read from the first memory, and transferring the realigned second bytes and the realigned third bytes from the burst buffer to the second memory.

\* \* \* \* \*